United States Patent [19]
Hamb et al.

[11] 3,902,904
[45] Sept. 2, 1975

[54] PHOTOGRAPHIC ELEMENT WITH POLYMER FILM SUPPORT

[75] Inventors: Frederick D. Hamb; John C. Wilson, both of Rochester, N.Y.

[73] Assignee: Eastman Kodak Company, Rochester, N.Y.

[22] Filed: Dec. 13, 1973

[21] Appl. No.: 424,483

Related U.S. Application Data

[62] Division of Ser. No. 331,134, Feb. 9, 1973, abandoned.

[52] U.S. Cl. ... 96/87 R; 117/138.8 R; 117/138.8 F; 117/138.8 D; 260/335 R
[51] Int. Cl.² .......................................... G03C 1/78
[58] Field of Search ........................... 96/87 R

[56] References Cited
UNITED STATES PATENTS

| | | | |
|---|---|---|---|
| 3,591,559 | 7/1971 | Kwolek | 260/49 |
| 3,657,185 | 4/1972 | Wear | 260/47 C |
| 3,658,757 | 4/1972 | Conix et al. | 260/49 |

OTHER PUBLICATIONS

Hamb, F. L. et al., Def. Pub. of Ser. No. 141,398 filed May 7, 1971, published 8960.G.422 on Mar. 14, 1972, Def. Pub. No. T896,034.

*Primary Examiner*—Ronald H. Smith
*Attorney, Agent, or Firm*—A. H. Rosenstein

[57] ABSTRACT

Novel monomers of 7,7-dimethyl-7H-dibenzo [c,h]-xanthene-5,9-disulfonyl halide (chloride) and novel high molecular weight polymers containing 7,7-dimethyl-7H-dibenzo-[c,h] xanthene residues are useful in the preparation of photographic film bases.

11 Claims, No Drawings

PHOTOGRAPHIC ELEMENT WITH POLYMER FILM SUPPORT

This application is a division of U.S. Ser. No. 331,134, filed Feb. 9, 1973 now abandoned of which U.S. application Ser. No. 452,299 filed Mar. 18, 1974 is a continuation application now issued as U.S. Pat. 3,859,254 issued Jan. 7, 1975. U.S. Ser. No. 331,134 is a continuation-in-part of U.S. Ser. No. 158,525, filed June 30, 1971 now abandoned.

FIELD OF THE INVENTION

This invention relates generally to novel monomers and to novel film-forming, polymeric compounds prepared by condensation reactions, and more particularly to novel film-forming, linear condensation polymers comprising residues of a bifunctional derivative of 7,7-dimethyl-7H-dibenzo[c,h] xanthene which polymers are used as supports for photographic emulsions.

BACKGROUND OF THE INVENTION

There is a continuing demand for low cost film-forming materials with improved physical properties which can be used as supports for photographic elements. Currently available film-forming compositions that retain good physical characteristics at temperatures above about 200°C have not found general acceptance because their manufacture involves expensive materials or difficult procedures.

SUMMARY OF THE INVENTION

It is therefore an object of this invention to provide a novel class of linear condensation polymers and copolymers comprising the residue of condensation polymers and copolymers comprising residues of a bifunctional 7,7-dimethyl-7H-dibenzo[c,h]xanthene which have improved physical properties such as high glass transition temperatures (Tg) and dimensional stability. Another object of this invention is to provide novel linear condensation polymers incorporating the residue of a bifunctional 7,7-dimethyl-7H-dibenzo[c,h]xanthene that can be readily prepared by existing procedures and technology. A further object is to provide novel film-forming linear polyesters, polysulfonamides, polysulfonates, polyester-polysulfonates, and polyurethanes and many other interpolymers comprising 7,7-dimethyl-5,9-7H-dibenzo [c,h]xanthylene units useful as supports for photographic elements that are subjected to high temperature processing. Yet, another object is to provide novel photographic elements comprising an improved support material.

These and other objects and advantages of this invention are obtained from a novel class of film-forming condensation polymers with improved physical properties which comprises residues of a bifunctional 7,7-dimethyl-7H-dibenzo[c,h]xanthene having the formula I:

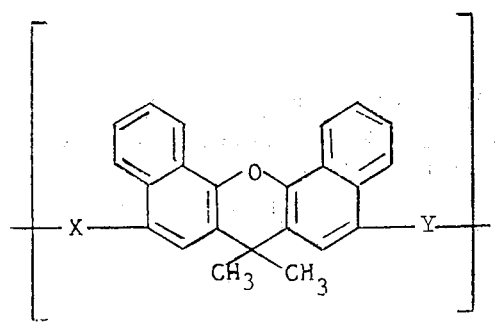

wherein X is —O—, —SO$_2$—, or

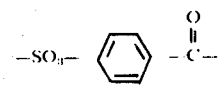

and Y is

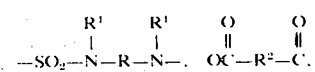

—SO$_3$—R$^3$—O, or

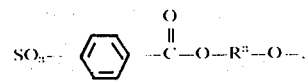

R is an alkylene radical, cycloalkylenebisalkylene radical, or arylenebisalkylene radical. R$^1$ is hydrogen, alkyl radical, aralkyl radical or aryl radical.

Useful members of the novel class of polymers of this invention include polyesters, copolyesters, polysulfonamides, copolysulfonamides, polysulfonates, copolysulfonates, polyester-polysulfonates, and polyurethanes. Generally any material containing functional groups reactive with difunctional units of 7,7-dimethyl-7H-dibenzo [c,h]xanthene may be copolymerized herein. The preferred polymers comprise polyesters, copolyesters, polysulfonamides, copolymers of sulfonamides, polysulfonates and polyester-polysulfonates.

In one aspect, linear, condensation polymer films made according to this invention can be solvent cast, treated to improve the adhesion of subsequent coatings and coated with photographic compositions. The polymers have improved physical properties such as high glass transition temperatures, chemical and physical stability at high temperature and good flexibility and can be prepared from low-cost starting materials. The resulting photographic elements can be processed at temperatures in excess of 200°C, preferably above at least 220°C, with very little effect on dimensional stability of the element.

A preferred embodiment according to this invention relates to linear polyester materials comprising dicarboxylic units of four or more carbon atoms esterified with diol units comprising 7,7-dimethyl-7H-dibenzo[c,h]xanthene-5,9-diol. The preferred polymers comprise units of 7,7-dimethyl-7H-dibenzo[c,h]xanthene-5,9-diyl.

Another preferred embodiment relates to linear polysulfonate materials comprising diol units condensed with 7,7-dimethyl-7H-dibenzo[c,h]xanthene-5,9-disulfonyl halide units.

Another preferred embodiment relates to linear polysulfonamide materials comprising diamine units reacted with 7,7-dimethyl-7H-dibenzo[c,h]xanthene-5,9-disulfonyl halide units.

A further preferred embodiment relates to linear polyester materials comprising dicarboxylic units of four or more carbon atoms esterified with diol units comprising 7,7-dimethyl-7H-dibenzo[c,h]xanthene-5,9-diol units and units of a dissimilar diol.

Another preferred embodiment relates to linear polyester-polysulfonate materials comprising diol units condensed with bis(4-carbomethoxyphenyl)7,7-dimethyl-7H-dibenzo[c,h]xanthene-5,9-disulfonate units.

A still further preferred embodiment relates to linear polysulfonate materials comprising diol units condensed with sulfonyl halide units comprising 7,7-dimethyl-7H-dibenzo[c,h]-xanthene-5,9-disulfonyl halide units and units of a dissimilar sulfonyl halide.

Other useful polymers of this invention include linear polyester materials comprising 7,7-dimethyl-7H-dibenzo[c,h]- xanthene-5,9-diol units esterified with units of a dicarboxylic compound of four or more carbon atoms and in copolymerized relationship therewith units of one or more dissimilar diols with units of one or more dissimilar dicarboxylic compounds of four or more carbon atoms. Similarly, still other desirable polymers according to this invention include polysulfonate materials comprising 7,7-dimethyl-7H-dibenzo[c,h]xanthene-5,9-disulfonyl halide units condensed with diol units, said polysulfonates having in copolymerized relationship therewith units of one or more dissimilar disulfonyl halides with units of one or more dissimilar diols.

This invention also contemplates polymers comprising 7,7-dimethyl-7H-dibenzo [c,h]xanthene 5,9-diol units condensed with sulfonate and carboxylic ester units.

This invention also contemplates novel monomers comprising the 5,9-disulfonyl halide derivative of 7,7-dimethyl-7H-dibenzo[c,h]xanthene and methods of preparing same. The preferred halide is the chloride.

DETAILED DESCRIPTION OF PREFERRED EMBODIMENTS OF THIS INVENTION

The polymers of this invention include 7,7-dimethyl-7H-dibenzo[c,h]xanthene residue and the polymers are represented by formulas II and III:

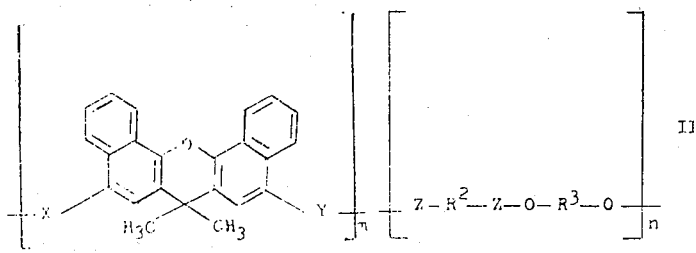

wherein X is $SO_2$ or

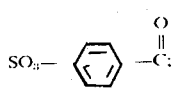

Y is

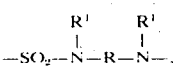

or $-SO_3-R^3-O$ when X is $SO_2$, or

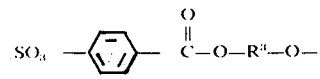

when X is

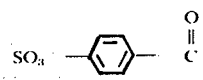

and

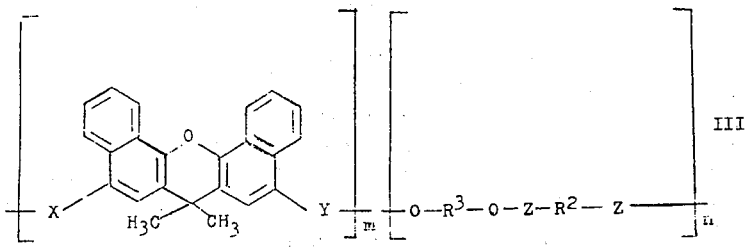

wherein X is O and Y is $$\overset{O}{\underset{\|}{OC}}-R^2-\overset{O}{\underset{\|}{C}}.$$

R is a radical selected from the group consisting of alkylene radicals of from 2 to 12 carbon atoms, preferably from 2 to 6 carbon atoms, such as ethylene, trimethylene, butylene, hexylene, octylene, decylene and the like; cycloalkylenebisalkylene radicals, such as 1,4-cyclohexylenedimethylene, 1,4-cyclohexylenediethylene and the like; and arylenebisalkylene radicals, such as 1,4-phenylenedimethylene, 1,4-phenylenediethylene and the like. Each $R^1$, which can be the same or different, is a radical selected from the group consisting of hydrogen atoms, alkyl radicals of from 1 to 4 carbon atoms; aralkyl radicals, such as benzyl or phenethyl; and aryl radicals, such as phenyl, including substituted phenyl, such as tolyl, anisyl, phenetyl. Z is $SO_2$ or

$m$ is 1 to 100 mole % and $n$ is 100-$m$ mole %.

The radical $R^2$ is selected from the group consisting of arylene radicals, such as o-, m-, or p-phenylene, naphthylene, anthrylene, 1,1,3-trimethyl-3-phenylindan-4',5-diyl, substituted or unsubstituted with radicals such as halogen, nitro, cyano, alkyl of 1 to 6 carbon atoms, or alkoxy of 1 to 6 carbon atoms; arylenebisalkylene radicals, where the alkylene portion comprises 1 to 6 carbon atoms, such as phenylenedimethylene, phenylenediethylene, naphthylenedimethylene, naphthylenediethylene and the like; and cycloalkylene radicals, such as cyclopentylene, cyclohexylene, norbornylene, and the like. The radical $R^2$ is preferably arylene.

The radical $R^3$ is selected from the group consisting of alkylene radicals of from 2 to 12 carbon atoms, cycloalkylene, and arylene radicals such as o-, m-, or p-phenylene, naphthylene anthrylene, and 3,3,3',3'-tetramethyl-1,1'-spirobi[indan]-6,6'-diyl. It may also be represented by the formula IV:

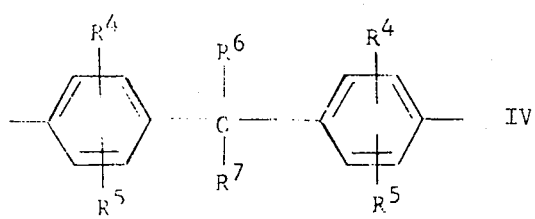

wherein each $R^4$ and $R^5$, which can be the same or different, are selected from the group consisting of hydrogen atoms, aryl radicals, such as phenyl, including substituted phenyl, halogen atoms, nitro radicals, cyano radicals, alkoxy radicals and the like, and wherein the substituents on the substituted phenyl may be a halogen atom, nitro radical, cyano radical or alkoxy radical. $R^6$ and $R^7$ represent aliphatic, monocyclic or bicyclic radicals and can each be hydrogen atoms, alkyl radicals of 1 to 6 carbon atoms including substituted alkyl radicals such as fluoromethyl, difluoromethyl, trifluoromethyl, dichlorofluoromethyl, 2-[2,3,4,5-tetrahydro-2,2-dimethyl-4-oxofur-3-yl]ethyl, and the like; cycloalkyl radicals of from 4 to 6 carbon atoms, such as cyclohexyl; and aryl radicals having 6 to 20 carbon atoms, such as phenyl, 3,4-dichlorophenyl, and 2,4-dichlorophenyl. $R^6$ and $R^7$ taken together with the carbon atom to which they are attached can represent a monocyclic, bicyclic or heterocyclic moiety having at least 4 atoms in the ring.

A very useful class of linear condensation polymers according to this invention that can be employed as flexible supports for photographic elements subjected to high temperature processing comprises polymers of recurring units having the formula V:

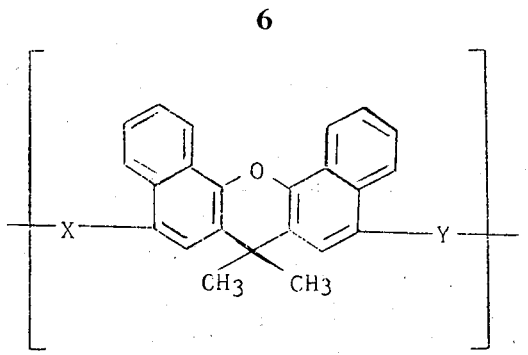

wherein X is $SO_2$, O or

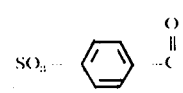

and Y is

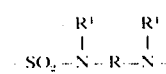

when X is $SO_2$,

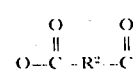

when X is O, $SO_3$-$R^3$-O when X is $SO_2$ and

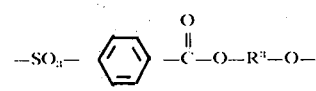

when X is

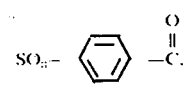

wherein each of R, $R^1$, $R^2$, and $R^3$, is as previously defined.

Another useful class of linear condensation polymers according to this invention that can be employed in the preparation of flexible supports for photographic elements subjected to high temperature processing is represented by the formula VI:

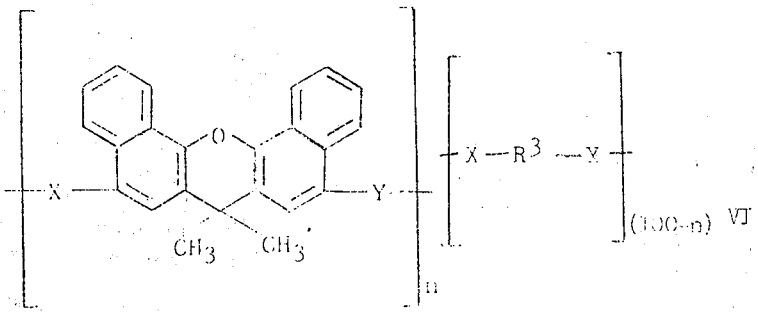

wherein X, Y, and R³ are as described hereinabove, and R³ is preferably arylene, and n is an integer of from 5 to 98, preferably 20 to 50.

In formula VI, the 7,7-dimethyl-5,9-7H-dibenzo[c,h]-xanthylene portion comprises from about 20 to about 50 mole percent of the linear copolymer, depending on the properties desired. In general, the higher the proportion of the 7,7-dimethyl-5,9-7H-dibenzo[c,h]xanthylene unit, the higher the glass transition temperature (Tg).

Bifunctional 7,7-dimethyl-7H-dibenzo[c,h]xanthenes useful in the practice of this invention include the 5,9-diol, the 5,9-diacetate and the 5,9-disulfonyl chloride derivatives of 7,7-dimethyl-7H-dibenzo[c,h]xanthene. These compounds can be prepared by any method suitable for this purpose. A desirable starting material is 7,7-dimethyl-7H-dibenzo[c,h]xanthene which is made, for example, in accordance with the procedure of Sen-Gupta, Journ. Chem. Soc., 1914, page 401 by reacting 1-naphthol and acetone in the presence of phosphoryl chloride at about 100°C for about 10 minutes. The 5,9-diol is conveniently obtained, in the manner of Sen-Gupta and Tucker said Journal, 557–568 (1922), by a two-step process which comprises: (1) dichromate oxidation of 7,7-dimethyl-7H-dibenzo[c,h]xanthene in a suitable solvent such as glacial acetic acid; and (2) reduction of the quinone intermediate with a conventional reducing agent, for example, zinc and glacial acetic acid.

Novel monomers which result in particularly useful polymers comprise 7,7-dimethyl-7H-dibenzo[c,h]xanthene 5,9-disulfonyl chloride. Conventional chlorosulfonation procedures can be employed in making the 5,9-disulfonyl chloride derivative of 7,7-dimethyl-7H-dibenzo[c,h]xanthene. For example, 1 mole of 7,7-dimethyl-7H-dibenzo[c,h]xanthene is treated with 4 moles of chlorosulfonic acid, preferably in an inert solvent such as carbon disulfide, chloroform, carbon tetrachloride, and the like. The chlorosulfonic acid is added at a rate sufficient to maintain the ambient temperature with external cooling. After stirring for a period of about 30 minutes, the 5,9-disulfonyl chloride derivative is isolated in the usual manner.

Alternatively, the desired 5,9-disulfonyl chloride is obtained in excellent yield by refluxing 7,7-dimethyl-7H-dibenzo-[c,h]xanthene-5,9-di(potassium sulfonate) with phosphoryl chloride. Still another useful procedure affording good yields of the 5,9-disulfonyl chloride comprises heating 7,7-dimethyl-7H-dibenzo[c,h]xanthene-5,9-di(tri-n-pentylammonium sulfonate) and phosphorus pentachloride for about 5 hours at about 100°–116°C.

As previously pointed out, condensation polymers according to this invention comprise units derived from bisphenols, monocyclic and polycyclic diols and alkylene glycols. The bisphenols employed in this invention are generally of the structure of formula VII:

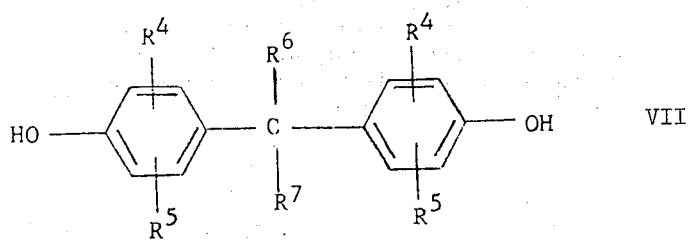

where $R^4$, $R^5$, $R^6$ and $R^7$ are as defined hereinabove.

Typical useful bisphenols include: Bisphenol A; 2,2-bis(4-hydroxy-3,5-dichlorophenyl)propane[tetrachlorobisphenol A]; 1-phenyl-1,1-bis(4-hydroxyphenyl)ethane; 1-(3,4-dichlorophenyl)-1,1-bis(4-hydroxyphenyl)ethane; 2,2-bis(4-hydroxyphenyl)-4-[3-(2,3,4,5-tetrahydro-2,2-dimethyl-4-oxofuryl)]butane; bis(4-hydroxyphenyl)methane; 2,4-dichlorophenylbis(4-hydroxyphenyl)methane; 1,1-bis(4-hydroxyphenyl)cyclohexane; 1,1,1,3,3,3-hexafluoro-2,2-bis(4-hydroxyphenyl)propane; and diphenylbis(4-hydroxyphenyl)methane.

Bisphenols of this type are economically attractive since they can generally be produced by the simple reaction mechanism as follows:

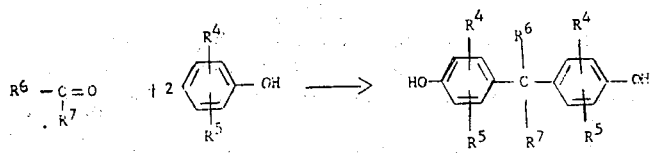

Other useful bisphenols include 1,4-naphthalenediol; 2,5-naphthalenediol; bis(4-hydroxy-2-methyl-3-propylphenyl)methane; 1,1'-bis(2-ethyl-4-hydroxy-5-sec.butylphenyl)ethane; 2,2'-bis(4-hydroxy-2-methyl-5-tert.butylphenyl)propane; 1,1'-bis(4-hydroxy-2-methyl-5-isoctylphenyl)isobutane and bis-(2-ethyl-4-hydroxyphenyl)-4,4'-di-p-tolylmethane. Still other useful bisphenols are disclosed in U.S. Pat. No. 3,030,335 and Canadian Pat. No. 576,491.

Typical monocyclic diols include hydroquinone and hydroquinones substituted with alkyl groups of 1 to 15 carbon atoms or halogen atoms; resorcinol, unsubstituted or substituted with lower alkyl groups or halogen atoms, and the like; 1,4-cyclohexanediol; 1,4-cyclohexanedimethanol; 1,4-cyclohexanediethanol; 1,-4-bis(2-hydroxyethoxy)cyclohexane, 1,4-benzenedimethanol; 1,4-benzenediethanol, and the like.

Exemplary alkylene glycols include ethylene glycol; diethylene glycol; triethylene glycol; 1,2-propanediol; 1,3-propanediol; 1,4-butanediol; 2,3-butanediol; 1,5-pentanediol; 1,6-hexanediol; 1,7-heptanediol; 1,8-octanediol; 1,9-nonanediol; 1,10-decanediol; 1,12-dodecanediol; neopentyl glycol; 2,2,4-trimethyl-1,6-hexanediol, and 4-oxa-2,6-heptanediol.

Dicarboxylic compounds that can be employed to advantage in the practice of this invention include phthalic acid; isophthalic acid; terephthalic acid; t-butylisophthalic acid; phenylenediacetic acid; phenylenedipropionic acid; 2,6-naphthalenedicarboxylic acid; 1,4-naphthalenedicarboxylic acid; 1,5-nephthalenedicarboxylic acid; 1,7-naphthalenedicarboxylic acid; 4,4'-diphenic acid; 4,4'-sulfonyldibenzoic acid; 4,4'-oxydibenzoic acid; binaphthyldicarboxylic acid; 4,4'-stilbenedicarboxylic acid, and 9,10-triptycenedicarboxylic acid.

Although the dicarboxylic acids useful in the practice of this invention can be employed in the free acid form, it is often more advantageous to utilize a bifunctional derivative thereof. For example, the corresponding acid anhydrides may be used where they are available. Other useful bifunctional equivalents include the lower monohydric alcohol and phenyl esters of dicarboxylic acids and the dicarboxylic acid halides, e.g. the chlorides or bromides.

The molecular weight of the linear condensation polymers of this invention can vary over wide ranges, although we have found that polymers having a molecular weight of at least 10,000 are useful. Linear polymeric compounds having molecular weight from about 15,000 to 50,000 are particularly desirable. The compounds of this invention are further characterized by their inherent viscosities. Generally, the subject film-forming polymers have an inherent viscosity of about 0.4 to about 1.2 and the polymers preferred as supports for photographic elements processed at high temperatures have an inherent viscosity of about 0.6 to about 0.8. The inherent viscosities herein reported are measured at 25°C at a concentration of 0.25g. of polymer per 100 ml. of solution. Unless otherwise specified, a solution of equal parts by weight of phenol and chlorobenzene is employed.

The glass transition temperatures of the polymers of this invention can be determined by differential scanning calorimetry as disclosed in "The DSC Cell and Accessories Instruction Manual for the 900 Thermal Analyzer and Modules," sold by E. I. duPont de Nemours Instrument Products Division.

Film-forming as used in this invention refers to a material which will provide a self-supporting film of the material when cast or extruded, for example, when cast in sheets of from 1 to 7 mils thickness.

It is appreciated, of course, that the physical properties of the broad class of novel polymers of this invention such as, for example, the glass transition temperature (Tg), yield strength, break strength, Young's modulus and the like, can be varied over a wide range. Polymers with properties in a particular range can be easily obtained by judicious selection of appropriate diol diamine or disulfonyl chloride components. The proper choice and proportions of the monomeric components can be determined by test procedures well known to those skilled in the art of making condensation polymers.

A useful class of polysulfonamides according to this invention comprises units of a diamine condensed with a disulfonyl halide units comprising from about 25 to about 75 mole percent 7,7-dimethyl-7H-dibenzo[c,h]xanthene-5,9-disulfonyl chloride units and from about 75 to about 25 mole percent dissimilar disulfonyl chloride units. These polymers contain recurring residues of a 7,7-dimethyl-7H-dibenzo[c,h]xanthene having 5,9-bis-sulfonamido groups.

Examples of diamines which may be used to condense with disulfonyl halide units herein are:

| | |
|---|---|
| ethylenediamine | o,m, and p-phenylenediamine |
| N-ethylethylenediamine | 2,4-diaminotoluene |
| N,N'-diethylethylenediamine | 2,5-diaminotoluene |
| N-methylethylenediamine | 2,6-diaminotoluene |
| 1,2-propanediamine | 3,4-diaminotoluene |
| 1,3-propanediamine | 2,3-diaminofluorene |
| N-methyl-1,3-propanediamine | 2,5-diaminofluorene |
| 1,4-butanediamine | 2,7-diaminofluorene |
| 1,5-pentanediamine | 1,2-diaminonaphthalene |
| 1,6-hexanediamine | 1,5-diaminonaphthalene |
| 1,7-heptanediamine | 1,8-diaminonaphthalene |
| 1,8-octanediamine | 2,3-diaminonaphthalene |
| 1,10-decanediamine | |
| 1,12-dodecanediamine | |
| N-cyclohexyl-1,3-propanediamine | |

A very valuable class of polymeric polysulfonates of this invention comprises units of a bisphenol condensed with disulfonyl halide units comprising from about 25 to about 75 mole percent 7,7-dimethyl-7H-dibenzo[c,h]xanthene-5,9-disulfonyl chloride units and from about 75 to about 25 mole percent dissimilar disulfonyl chloride units.

Compounds having two sulfonyl halide groups that are useful in the practice of the invention include o-, m-, and p-benzenedisulfonyl chloride; 4,4'-bephenyldisulfonyl chloride; 4,4'-biphenyletherdisulfonyl chloride, and the naphthalenedisulfonyl chlorides wherein the two sulfonyl chloride groups are attached at the 1,2, the 1,3, the 1,4, the 1,5, the 1,6, the 1,7, the 2,6, and the 2,7 positions respectively.

A highly desirable class of polymeric polyesters in accordance with this invention comprises units of terephthalic acid esterified with diacetate units which comprise from about 20 to about 80 mole percent 7,7-dimethyl-7H-dibenzo[c,h]xanthene-5,9-diacetate units and from about 80 to about 20 mole percent bisphenol diacetate units.

As indicated hereinabove, the preferred linear condensation polymers of this invention include polysulfonamides, polysulfonates, polyesters and polyester-polysulfonate units. Other polymers may include polyurethanes, polyimides and the like. Generally any procedure known in the art for making linear condensation polymers can be used for preparing these polymers. The following are examples of processes that may be utilized to produce linear polymers of this invention.

a. The interfacial procedure can be utilized to make the polymers. A preferred embodiment with regard to the materials, solvents and catalysts is shown in Example 3. The preferred time of reaction is a function of all other variables and, as such, is governed by the viscosity desired for the polymer. Generally, the reaction can be monitored by sampling and thus the preferred polymerization time chosen. A variety of solvents may be employed to provide a broader range of reaction temperatures and solubilities as desired. Suitable solvents include methylene chloride, chloroform, carbon tetrachloride and the like.

b. Polymers according to this invention can be prepared by a solution procedure whereby a bifunctional derivative of 7,7-dimethyl-7H-dibenzo[c,h]xanthene, for example, the 5,9-disulfonyl chloride, and the coreactant(s), for example an alkylene diamine, are placed in solution in the presence of an acid acceptor such as, for example, pyridine. The acid acceptor can be present in excess and thus serve also as a solvent.

c. The ester interchange procedure of synthesizing polymeric esters both by the melt process and the powder process can advantageously be used to make the polymers of this invention, particularly for those copolymers which can be crystallized. Example 11 is illustrative of this technique. This procedure affords flexible film-forming polymers having improved physical properties including high softening temperatures and high molecular weights. The melt process is advantageously conducted in the presence of a catalytic agent. Useful catalysts for the transesterification reactions include the carbonate, oxide, hydroxide, hydride and alkoxide of an alkali metal or an alkaline earth metal, a compound of a Group IVA metal of the Periodic Table, e.g., titanium isopropoxide, organometallic halides and complex alkoxides such as $NaHTi(OC_4H_9)_2$ and the like.

The film-forming materials of this invention can be generally extruded or cast into flexible supports and used in various layer arrangements and structural combinations. Generally, the flexible supports of this invention are treated by any convenient method to improve the adhesion of superimposed coatings or layers. Useful procedures include subbing with conventional subbing agents for polymer supports, contacting with a chemical agent such as sulfuric acid, corona discharge, treating with a reactive gas according to the procedure of Lidel, U.S. Ser. No. 80,482, filed Oct. 13, 1970 and Belgian Pat. No. 736,993, and the like. The film-forming polymers of this invention are used to advantage as flexible supports for photographic silver halide and other light-sensitive systems as well as for multilayer elements used in color photography and diffusion transfer processes.

In a preferred embodiment, a support of a polymer of this invention is used as the film support in photographic elements which are heat-processed or heat-stabilized. In particular, one preferred embodiment relates to photographic elements comprising the supports of this invention having at least one layer of a photographic emulsion which contains silver halide grains having polyvalent ions occluded therein as disclosed in Bacon et al., U.S. Pat. No. 3,447,927. Elements of this type can be processed according to Colt, U.S. Pat. No. 3,418,122, issued Dec. 24, 1968.

The following examples illustrate the preparation of the polymers of this invention.

EXAMPLE 1

Preparation of
7,7-Dimethyl-7H-dibenzo[c,h]xanthene-5,9-di(potassium sulfonate)

Chlorosulfonic acid, 42 ml. (75g., 0.644 mole) is added to a solution of 50g. (0.161 mole) of 7,7-dimethyl-7H-dibenzo[c,h]xanthene in 250 ml. of chloroform over a 10 minute period with external cooling to maintain a reaction temperature of 10° to 30°C. The insoluble complex is collected and washed well with chloroform. This solid is then added to a solution of 56g. (1.0 mole) of potassium hydroxide in 500 ml. of ethanol. The white solid which forms is collected, washed with ethanol and dried. The dried solid is slurried in 1.0 liter of boiling ethanol, collected and dried again. The yield of solid is 95.5g.; m.p. is above 300°C.

The I.R. spectrum and the NMR spectrum indicate that the product comprises 7,7-dimethyl-7H-dibenzo[c,h]xanthene-5,9-di(potassium sulfonate) and a small amount of inorganic potassium salts.

EXAMPLE 2

Preparation of
7,7-Dimethyl-7H-dibenzo[c,h]xanthene-5,9-disulfonyl chloride

Forty g. of the product obtained in Example 1 is treated with 200 ml. of refluxing phosphoryl chloride for 16.5 hours. The mixture is then poured into ice water and the solid collected and washed with water. The damp material is then recrystallized from 1.5 liters of methyl ethyl ketone with decolorizing carbon. The yield of 7,7-dimethyl-7H-dibenzo-[c,h]xanthene-5,9-disulfonyl chloride is 5.7g. (16.7 percent based on 7,7-dimethyl-7H-dibenzo[c,h]xanthene): mp=278°–280°C (decomposition). The second crop yield, after concentrating to one half volume, is 5.1g. (14.9 percent based on 7,7-dimethyl-7H-dibenzo[c,h]-xanthene); mp=276°–278°C (decomposition).

The NMR and I.R. spectra of the first crop material support the proposed structure.

A repetition of the immediately described procedure affords a combined first and second crop yield of 51.5%.

EXAMPLE 3

Polymerization of
7,7-Dimethyl-7H-dibenzo[c,h]-xanthene-5,9-disulfonyl chloride and 1,6-Hexanediamine, Interfacial Process In a blender is placed 0.58g. (0.005 mole) of 1,6-hexanediamine, 1.05g. (0.010 mole) of sodium carbonate, 50 ml. of distilled water and 4 ml. of a twenty percent solution of Duponol ME (sodium lauryl sulfate, manufactured by E. I. du Pont de Nemours Co.) in water. To this stirred solution is added a solution of 2.53g. (0.005 mole) of 7,7-dimethyl-7H-dibenzo-[c,h]xanthene-5,9-disulfonyl chloride, prepared in the manner of Example 2, in 100 ml. of chloroform. The mixture is stirred for 35 minutes. At this time, the mixture is poured into 1400 ml. of methanol precipitating the polymer. The polymer is collected and dried. The inherent viscosity is 0.35 and the Tg is 206°C.

The procedure of Example 3 is repeated except that the 1,6-hexanediamine is replaced by equivalent amounts of other diamines. The compounds employed and the physical properties of the resultant polymers are set out in Table I below.

Table I

| Example | Diamine | Inherent Viscosity | Tg(°C) |
|---|---|---|---|
| 4 | H₂NCH₂CH₂NH₂ | 0.24 | 276 |
| 5 | H₂N(CH₂)₃NH₂ | 0.31 | 261 |
| 6 | H₂NCH₂——CH₂NH₂ | 0.23 | 249 |
| 7 | H₂N(CH₂)₆NH₂ | 0.35 | 206 |

EXAMPLE 8

Polymerization of
7,7-Dimethyl-7H-dibenzo[c,h]-xanthene-5,9-
disulfonyl Chloride and 1,6-Hexanediamine. Solution Process In a 100 ml three-neck flask equipped with a stirrer, thermometer and condenser is placed a solution of 0.58g. (0.005 mole) of 1,6-hexanediamine, 2.53g. (0.005 mole) of 7,7-dimethyl-7H-dibenzo[c,h]xanthene-5,9-disulfonyl chloride and 100 ml. of pyridine. The solution is heated from room temperature to 85°C over a four-hour period. The solution is then poured into 1500 ml. of 4:1 methanol:water, and the polymer is collected and dried. The inherent viscosity is 0.17.

EXAMPLE 9

Polymerization of
7,7-Dimethyl-7H-dibenzo[c,h]xanthene-5,9-disulfonyl
Chloride and 4,4'-Isopropylidenediphenol. Interfacial
Process In a blender is placed 1.14g. (0.005 mole) of 4,4'-isopropylidenediphenol, 22 ml. (0.011 mole) of 0.5 N NaOH, 28 ml. of distilled water and one drop of tri-n-butylamine. To this solution is added a solution of 2.53g (0.005 mole) of 7,7-dimethyl-7H-dibenzo[c,h]xanthene-5,9-disulfonyl chloride in 150 ml. of methylene chloride. The mixture is stirred for two hours and forty-five minutes adding 50 ml. of 1,2-dichloroethane after 1 hour and 25 minutes of reaction. At the end of this time, 5 ml. of acetic acid is added and the mixture is poured into 1400 ml. of methanol. The polymer is collected and dried at 50°C for 17 hours. The inherent viscosity in chloroform is 0.07 and the Tg is 220°C.

EXAMPLE 10

Polymerization of
7,7-Dimethyl-7H-dibenzo[c,h]xanthene-5,9-disulfonyl
Chloride, 1,3-Benzenedisulfonyl Chloride and
4,4'-Isopropylidenediphenol. 50:50 Interfacial Process In a blender is placed 2.28g (0.01 mole) of 4,4'-isopropylidenediphenol, 44 ml. (0.022 mole) of 0.5 N NaOH, 56 ml. of distilled water and two drops of tri-n-butylamine. To this solution is added a solution of 2.53g. (0.005 mole) of 7,7-dimethyl-7H-dibenzo[c,h]xanthene-5,9-disulfonyl chloride and 1.37g. (0.005 mole) of 1,3-benzenedisulfonyl chloride in 100 ml. of chloroform. The mixture is stirred for 3 hours and 35 minutes. After 1 hour and 40 minutes of reaction, 50 ml. of additional chloroform is added. After completion of this stirring, 5 ml. of acetic acid is added and the mixture is poured into 1500 ml. of methanol. The polymer is collected and dried at 50°C for 17 hours. The inherent viscosity in chloroform is 0.11 and the Tg is 160°C.

EXAMPLE 11

Polymerization of
7,7-Dimethyl-7H-dibenzo[c,h]-xanthene-5,9-
diacetate, 2,2-Bis(p-acetoxyphenyl)-propane and
Terephthalic Acid. 30:70 Melt Process In a polymer flask equipped with a nitrogen inlet tube, and a Vigreux-Claissen adapter is placed 0.60g. (0.0014 mole) of 7,7-dimethyl-7H-dibenzo[c,h]xanthene-5,9-diacetate, 1.03g. (0.0033 mole) of 2,2-bis(p-acetoxyphenyl)propane, 0.78g. (0.0047 mole) of terephthalic acid and a catalytic amount of dibutyltin oxide. With nitrogen bubbling through the reaction mixture, the flask is heated from 265°C to 300°C over a one and one-half hour period. The polymer is then isolated, ground to a powder and heated in a polymer flask at 300°C at 0.10 mm pressure for three hours. The polymer is then removed from the reaction flask. The inherent viscosity is 0.60 and the Tg is 299°C.

EXAMPLE 12

Preparation of Bis(4-carbomethoxyphenyl)
7,7-dimethyl-7H-dibenzo[c,h]xanthene-5,9-
disulfonate A mixture of 50.7g. (0.10 mole) of 7,7-dimethyl-7H-dibenzo[c,h]xanthene-5,9-disulfonyl chloride, 30.4g. (0.20 mole) of methyl 4-hydroxybenzoate and 500 ml. of pyridine is stirred at reflux for 1.5 hours. The solution is then concentrated to dryness. The solid residue is dissolved in 500 ml. of chloroform and washed with two portions of water. The organic layer is dried over sodium sulfate, filtered and concentrated to an oil. This oil is dissolved in 250 ml. of methyl ethyl ketone, diluted further with 250 ml. of methanol, treated with decolorizing carbon, filtered and cooled. The crystals are collected, dried and recrystallized again from 300 ml. of methyl ethyl ketone giving 12.8g (17.3%) of bis(4-carbomethoxyphenyl) 7,7-dimethyl-7H-dibenzo[c,h]xanthene-5,9-disulfonate; m.p.=209°-210.5°C.

EXAMPLE 13

Polymerization of Bis(4-carbomethoxyphenyl)
7,7-Dimethyl-7H-dibenzo[c,h]xanthene-5,9-
disulfonate and Ethylene Glycol A mixture of 6.40g (8.67 × 10⁻³ mole) of bis(4-carbomethoxyphenyl) 7,7-dimethyl-7H-dibenzo[c,h]xanthene-5,9-disulfonate and 2.00g (3.22 × 10⁻² mole) of ethylene glycol is treated with a catalytic amount of zinc acetate dihydrate and antimony (III) oxide for 1.5 hours in a polymer flask equipped with a nitrogen addition tube and Vigreux-Claissen adapter. During this time, the mixture is heated from 240°C to 287°C. The nitrogen tube is then removed, stirring is initiated and the system is evacuated to 0.50 mm. This reduced pressure and stirring is maintained for 3 hours. The polymer is then cooled and isolated. Inherent Viscosity is 0.47 and Tg is 150°C.

EXAMPLE 14

Polymerization of Bis(4-carbomethoxyphenyl)
7,7-Dimethyl-7H-dibenzo[c,h]xanthene-5,9-
disulfonate and 1,4-Cyclohexanedimethanol This polymer is prepared in the manner of Example 13 from a mixture of 6.40g (8.67 × 10⁻³ mole) of bis(4-carbomethoxy-phenyl) 7,7-dimethyl-7H-dibenzo[c,h]xanthene-5,9-disulfonate and 2.50g. (1.73 × 10⁻² mole) of 1,4-cyclohexanedimethanol and employing a catalytic amount of zinc acetate dihydrate and antimony (III) oxide. Inherent viscosity is 0.24 and Tg is 191°C.

It has been mentioned previously that the condensation polymers of this invention are employed to advantage in the preparation of flexible films. Certain of these films, prepared from polymers of this invention that have glass transition temperatures above about 200°C, and preferably above 220°C, are especially useful as flexible supports for photographic elements that are processed at high temperatures.

A convenient procedure for converting a polymer of this invention to film form is the well-known method of solvent casting, although other commonly used methods such as extrusion may be employed. Film formation by solvent casting and the preparation of a photographic product for high temperature processing are typically illustrated by Examples 15 and 16, respectively.

EXAMPLE 15

A solution in 20 ml. of tetrahydrofuran of 1.7g. of polysulfonamide polymer prepared from 7,7-dimethyl-7H-dibenzo-[c,h]xanthene-5,9-disulfonyl chloride and 1,6-hexanediamine in the manner of Example 3 and having an inherent viscosity of 0.48 is filtered through diatomaceous earth. The clear filtrate is then coated on a Teflon-covered glass plate and allowed to dry at room temperature for seventeen hours and then at 50°C for 47 hours. A clear amorphous self-supporting film of 4.5 mils thickness is formed.

EXAMPLE 16

A strip of the film prepared in Example 15 is treated according to the procedure of Lidel referred to hereinabove, to promote adhesion of the photographic emulsion that is applied in the next step. The treated strip is coated with a light-sensitive printout emulsion prepared according to the procedure of Bacon referred to hereinabove. The emulsion coating has a thickness of 4 mils. The dried, coated silver halide emulsion adheres well to the treated film support as evidenced by a cellophane tape test.

In this test, the dry coated emulsion layer is scored in a cross-hatch pattern and a piece of cellophane tape is pressed firmly over the scored area. The tape is then stripped quickly from the film. If the bond between the emulsion layer and film is strong, the emulsion layer is not removed from the film by the tape. A weak bond facilitates removal of the emulsion layer by the tape.

It will be appreciated that any conventional procedure for promoting adhesion of a photographic emulsion could be used. Typical procedures include corona treatment, chemical treatment, suitable subbing layers, and the like.

Films prepared from the linear condensation polymers of this invention are highly useful as flexible supports for photographic silver halide emulsions which must be processed at elevated temperatures. Similarly, films prepared from the polymers of this invention can be employed as flexible supports for light-sensitive photographic elements that are processed solely by the application of heat. The polymers of this invention find further use as supports for light-sensitive colloid layers such as are employed in image transfer processes, in lithography, and the like. The high temperature characteristics and dimensional stability of the subject polymers make them suitable as supports for photoresists such as these utilized in the preparation of printed circuits, and the like. Additionally, the polymeric compositions of this invention can be solvent cast, extruded or molded and are therefore useful as fibers, as components of tire cord, lacquers, molding resins, engineering plastics and the like.

Polymeric compositions according to this invention are advantageously prepared by standard techniques using well-known industrial processes. The compounds employed in making the polymers of this invention are prepared from readily available, inexpensive materials. A further advantage of the polymers of this invention is that they may be readily formed into film using procedures compatible with commercially available equipment.

The invention has been described in detail with particular reference to preferred embodiments thereof, but it will be understood that variations and modifications can be effected within the spirit and scope of the invention.

We claim:

1. A photographic element comprising a photographic emulsion coated on a film of a linear homopolymer or copolymer of a 7,7-dimethyl 5,9-7H-dibenzo[c,h]-xanthylene group.

2. A photographic element comprising a photographic emulsion coated on a film of a polymer comprising recurring units having the formula:

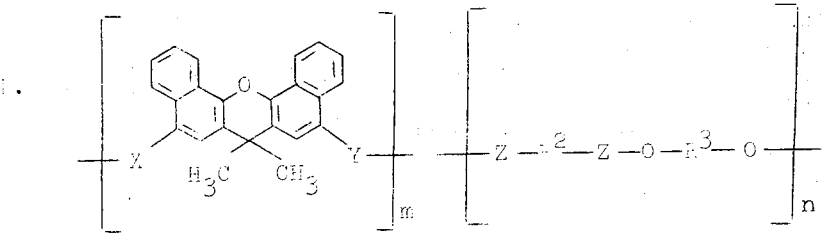

wherein X is SO₂ or

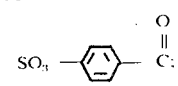

Y is

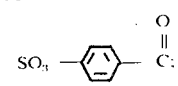

or -SO₂-R³-O when X is SO₂ or

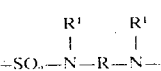

when X is

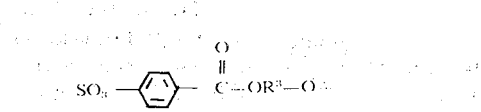

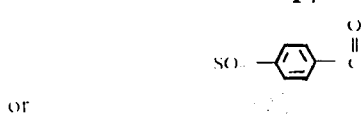

or

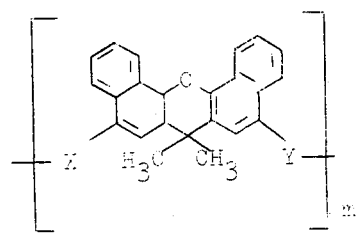

wherein X is O and Y is

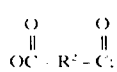

Z is SO₂ or

*m* is 1 to 100 mole percent and *n* is 100-m mole percent; R is a radical selected from the group consisting of alkylene radicals of from 2 to 12 carbon atoms, cycloalkylenebisalkylene radicals and arylenebisalkylene radicals; each R¹ which can be the same or different is a radical selected from the group consisting of hydrogen atoms, alkyl radicals of from 1 to 4 carbon atoms, aralkyl radicals, aryl radicals and tolyl, anisyl, and phenethyl radicals; each R², which can be the same or different, is a radical selected from the group consisting of cycloalkylene radicals, arylene radicals, substituted arylene radicals wherein the substituents are halogen, nitro, cyano, alkoxy of 1 to 6 carbon atoms and alkyl radicals of 1 to 6 carbon atoms, and arylenebisalkylene radicals having 1 to 6 carbon atoms in the alkylene portion, and each R³, which can be the same or different, is a radical selected from the group consisting of alkylene radicals of from 2 to 10 carbon atoms, cycloalkylene, arylene radicals, and substituted arylene radicals wherein the substituents are halogen, nitro, cyano, alkyl of 1 to 6 carbon atoms, and alkoxy of 1 to 6 carbon atoms.

3. The photographic element of claim 2 wherein R³ is represented by the formula:

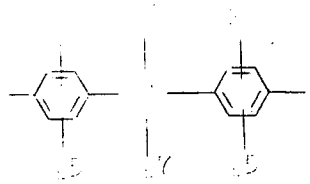

wherein each R¹ and R⁵, which can be the same or different, are selected from the group consisting of hydrogen atoms, aryl radicals, halogen atoms, nitro radicals, cyano radicals, alkoxy radicals and substituted phenyl

wherein the substituents can be halogen, cyano, nitro and alkoxy, and R⁶ and R⁷ are selected from the group consisting of hydrogen atoms, alkyl radicals of from 1 to 6 carbon atoms, fluoromethyl, difluoromethyl, trifluoromethyl, dichlorofluoromethyl, 2-[2,3,4,5-tetrahydro-2,2-dimethyl-4-oxofur-3-yl]ethyl radicals, cycloalkyl radicals, and aromatic radicals of from 6 to 20 carbon atoms.

4. The photographic element of claim 2 wherein X is SO₂.

5. A photographic element of claim 2 wherein X is O.

6. The photographic element of claim 2 wherein X is

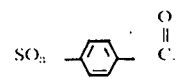

7. A photographic element comprising a photographic emulsion coated on a film of a polymer having recurring units having the formula:

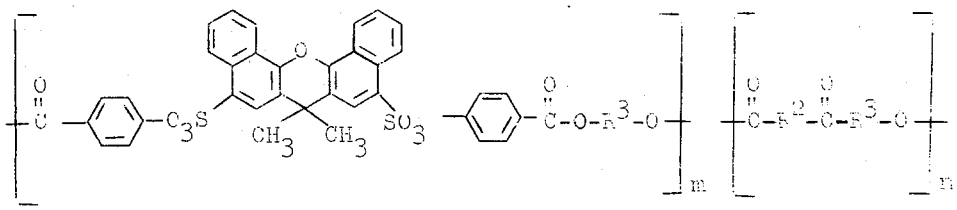

wherein R² is a radical selected from the group consisting of cycloalkylene radicals, arylene radicals, substituted arylene radicals, wherein the substituents are halogen, nitro, cyano, alkoxy of 1 to 6 carbon atoms and alkyl radicals of 1 to 6 carbon atoms, and arylenebisalkylene radicals having 1 to 6 carbon atoms in the alkylene portion; each R³, which can be the same or different is a radical selected from the group consisting of alkylene radicals of from 2 to 10 carbon atoms, cycloalkylene, arylene radicals, and substituted arylene radicals wherein the substituents are halogen, nitro, cyano, alkyl of 1 to 6 carbon atoms, and alkoxy of 1 to 6 carbon atoms; *m* is 1 to 100 mole percent and *n* is 100-m mole percent.

8. A photographic element comprising a photographic emulsion coated on a film of a polymer comprising recurring units having the formula:

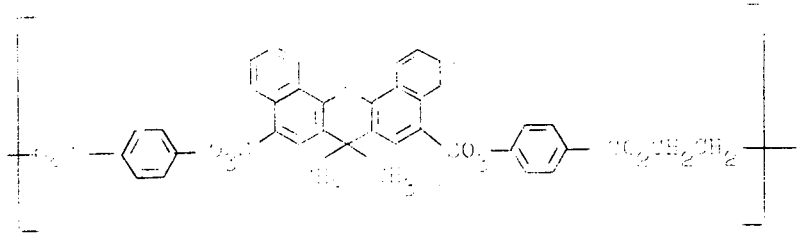

9. A photographic element comprising a photographic emulsion coated on a film of a polymer comprising recurring units having the formula:

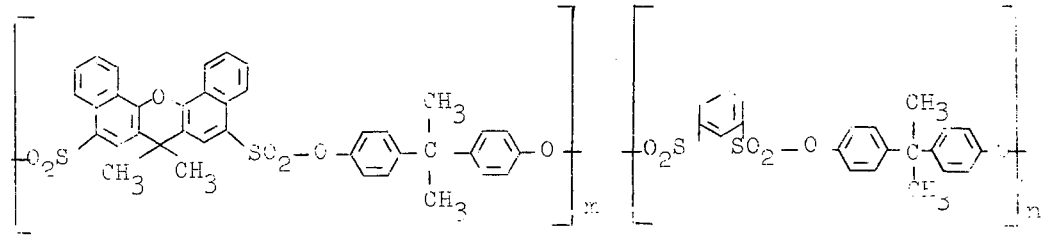

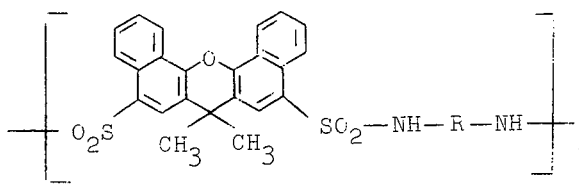

wherein R is a radical selected from the group consisting of alkylene radicals of from 2 to 12 carbon atoms, cycloalkylenebisalkylene radicals and arylenebisalkylene radicals.

10. A photographic element comprising a photographic emulsion coated on a film of a polymer comprising recurring units having the formula:

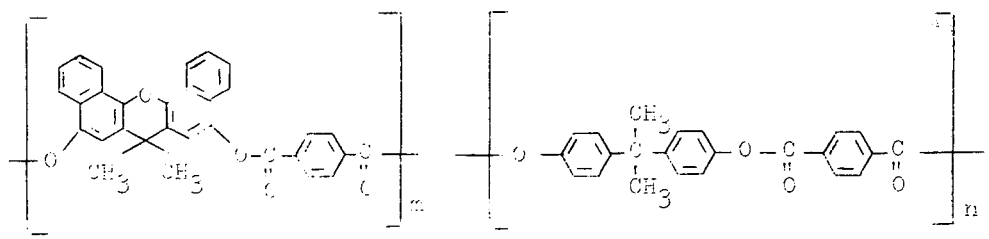

wherein $m$ is 1 to 100 mole percent and $n$ is 0 or 100-$m$ mole percent.

11. A photographic element comprising a photographic emulsion coated on a film of a polymer comprising recurring units having the formula:

wherein $m$ is 1 to 100 mole percent and $n$ is 0 or 100-$m$ mole percent.

* * * * *